United States Patent
Nishino et al.

(10) Patent No.: US 12,210,844 B2
(45) Date of Patent: Jan. 28, 2025

(54) GENERATION APPARATUS, GENERATION METHOD AND PROGRAM

(71) Applicant: NIPPON TELEGRAPH AND TELEPHONE CORPORATION, Tokyo (JP)

(72) Inventors: Masaaki Nishino, Tokyo (JP); Tsutomu Hirao, Tokyo (JP); Masaaki Nagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 337 days.

(21) Appl. No.: 17/435,002

(22) PCT Filed: Feb. 21, 2020

(86) PCT No.: PCT/JP2020/007211
§ 371 (c)(1),
(2) Date: Aug. 30, 2021

(87) PCT Pub. No.: WO2020/179519
PCT Pub. Date: Sep. 10, 2020

(65) Prior Publication Data
US 2022/0138434 A1    May 5, 2022

(30) Foreign Application Priority Data
Mar. 1, 2019   (JP) ................. 2019-037605

(51) Int. Cl.
*G06F 40/40*   (2020.01)
*G06F 17/16*   (2006.01)
*G06F 40/205*   (2020.01)

(52) U.S. Cl.
CPC ............. *G06F 40/40* (2020.01); *G06F 17/16* (2013.01); *G06F 40/205* (2020.01)

(58) Field of Classification Search
None
See application file for complete search history.

(56) References Cited

U.S. PATENT DOCUMENTS

2020/0013393 A1* 1/2020 Huang .................... G10L 15/16

FOREIGN PATENT DOCUMENTS

EP       2030659 A2 *  3/2009  ............ A63F 3/0421

OTHER PUBLICATIONS

Robertz, Sven Gestegard. "Anagram generation using sentence probabilities." (2002). (Year: 2002).*
Robertz, Sven Gestegard, "Anagram generation using sentence probabilities", Jun. 3, 2002 (Year: 2002).*
Healy, Alexander D., "Finding anagrams via lattice reduction", (2002) (Year: 2002).*

(Continued)

*Primary Examiner* — Pierre Louis Desir
*Assistant Examiner* — Daniel W Chung

(57) ABSTRACT

Included are input means for inputting first data that is data relating to a plurality of letters included in a text string that is a generation target, and generating means for generating second data that is data relating to the text string that satisfies predetermined constraint conditions including at least a condition relating to plausibility of the sequence of letters, on the basis of the first data.

20 Claims, 6 Drawing Sheets

(56) References Cited

OTHER PUBLICATIONS

Wordsmith.org (2019) "Internet anagram server" [online] Accessed on Feb. 28, 2019(Reading Day), website: https://wordsmith.org/anagram/.
Suzuki et al. (2011) "Automatic Generation of Japanese Anagrams by Using Bunsetsu Database" FIT2011 10th Information Science and Technology Forum Dissertation Proceedings vol. 2, pp. 97-102.

* cited by examiner $$F = \begin{pmatrix} a & c & h & i & m & r & s & t \\ 1 & 1 & 1 & 1 & 1 & 1 & 2 & 1 \end{pmatrix}$$

$$X = \begin{pmatrix} & a & c & h & i & m & r & s & t \\ \text{trims} & 0 & 0 & 0 & 1 & 1 & 1 & 1 & 1 \\ a & 1 & 0 & 0 & 0 & 0 & 0 & 0 & 0 \\ \text{cash} & 1 & 1 & 1 & 0 & 0 & 0 & 1 & 0 \\ \text{shirts} & 0 & 0 & 1 & 1 & 0 & 1 & 2 & 1 \\ \text{has} & 1 & 0 & 1 & 0 & 0 & 0 & 1 & 0 \end{pmatrix}$$

Fig. 5

GENERATION APPARATUS, GENERATION METHOD AND PROGRAM

CROSS-REFERENCE TO RELATED APPLICATIONS

This application is a U.S. 371 Application of International Patent Application No. PCT/JP2020/007211, filed on 21 Feb. 2020, which application claims priority to and the benefit of JP Application No. 2019-037605, filed on 1 Mar. 2019, the disclosures of which are hereby incorporated herein by reference in their entireties.

TECHNICAL FIELD

The present invention relates co a generating device, a generating method, and a program.

BACKGROUND ART

Anagrams, which are a type of word game, are known. An anagram is to rearrange letters included in a given sentence (or word, phrase, or the like) and create a different sentence (or a different word, a different phrase, or the like). Also, the different sentence (or different word, a different phrase, or the like) that is created in this way may itself be referred to as an anagram. For example, "Trims cash" is an anagram of "Christmas".

Technology for automatically generating anagrams from given sentences (or words, phrases, or the like) is known (NPL 1).

CITATION LIST

Non Patent Literature

[NPL 1] "Internet anagram server", [online], wordsmith.org/anagram

SUMMARY OF THE INVENTION

Technical Problem

However, it is difficult for conventional technology that generates anagrams to take into consideration how natural the generated anagrams are. That is to say, with the conventional technology, other text strings that use all of the letters included in a given text string can be generated, for example, but there were instances in which text strings were generated that humans could not understand when read.

With the foregoing in view, it is an object of the present invention to rearrange a given text string and create a different text string that takes into consideration the naturalness thereof.

Means for Solving the Problem

In order to achieve the above object, a generating device according to an embodiment of the present invention includes input means for inputting first data that is data relating to a plurality of letters included in a text string that is a generation target, and generating means for generating second data that is data relating to the text string that satisfies predetermined constraint conditions including at least a condition relating to plausibility of the sequence of letters, on the basis of the first data.

Effects of the Invention

A given text string can be rearranged to create a different text string that takes into consideration the naturalness thereof.

BRIEF DESCRIPTION OF DRAWINGS

FIG. 5 is a diagram for describing an example of a number-of-occurrences vector F and a matrix X.

DESCRIPTION OF EMBODIMENTS

An embodiment of the present invention will be described below. In the embodiment of the present invention, a generating device 10 that rearranges a given text string to create a different text string that takes into consideration the naturalness thereof will be described.

Although an example of a sentence is given here as a text string to be given to the generating device 10, this does not necessarily have to be a sentence. The text string may be, for example, words, phrases, or clauses, or may be a set of words. Alternatively, one or more letters, and the number of each of the letters may be given to the generating device 10, for example. A case in which the text string given to the generating device 10 is a sentence, and the letters included in this sentence are rearranged to generate a difference sentence (anagram) will be described below as an example.

The generating device 10 according to the embodiment of the present invention searches for sentences (anagrams) where letters included in a given sentence are rearranged by a depth-first search algorithm, and partway through the search, conditions relating to naturalness of the sentence are evaluated using a predetermined language model. The generating device 10 according to the embodiment of the present invention can efficiently generate natural anagrams by calling off searches for sentences that do not satisfy conditions relating to naturalness (i.e., by performing pruning).

Note that conditions necessary for rearranging a given text string and generating another text string, including the above conditions relating to naturalness of the sentence, are also referred to as "constraint conditions". Accordingly, a text string generated by the generating device 10 according to the embodiment of the present invention (e.g., an anagram) can be said to be "a text string that satisfies constraint conditions" or "a text string in a sequence that satisfies constraint conditions" or the like.

<Functional Configuration of Generating Device 10>

Figure 1:
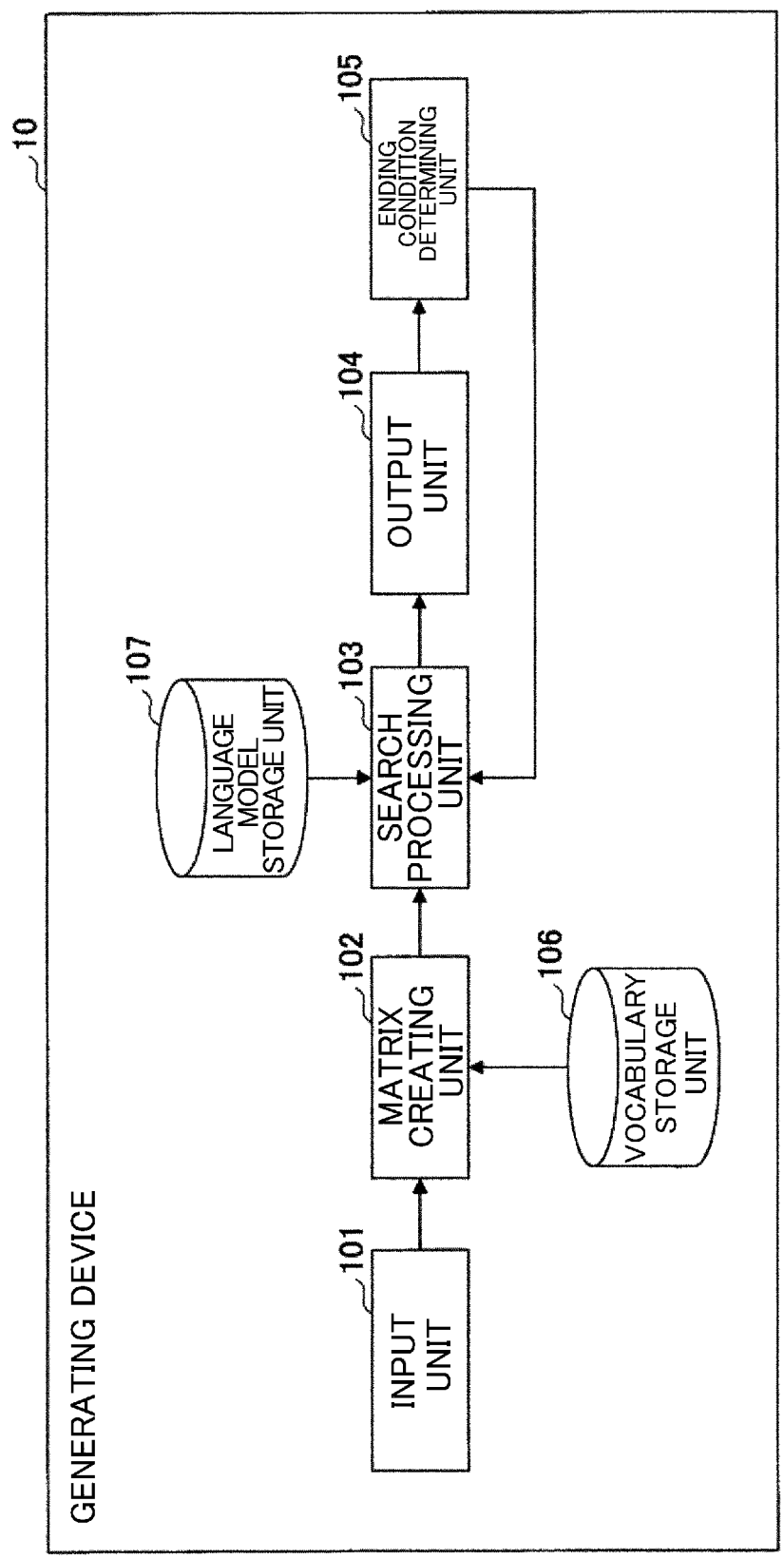
FIG. 1 is a diagram illustrating an example of a functional configuration of a generating device according to an embodiment of the present invention.

First, a functional configuration or the generating device 10 according to the embodiment of the present invention will be described with reference to FIG. 1 is a diagram illustrating an example of the functional configuration of the generating device 10 according to the embodiment of the present invention.

The generating device 10 according to the embodiment of the present invention has, as functional units, an input unit 101, a matrix creating unit 102, a search processing unit 103, an output unit 104, and an ending condition determining unit 105, as illustrated in FIG. 1. The generating device 10 according to the embodiment of the present invention also has, as storage units, a vocabulary storage unit 106 and a language model storage unit 107.

The vocabulary storage unit 106 stores a set of words that can be used at the time of generating an anagram.

The language model storage unit 107 stores a language model that outputs values representing naturalness of sentences. A language model is a model that takes a sentence as input, and outputs frequency probabilities of words that will come next in that sentence.

In the embodiment of the present invention, the language model is a language model realized by an RNN (Recurrent Neural Network) (hereinafter, also referred to as "RNN language model"). An RNN language model outputs a conditional probability $p(w_i|w_1, w_2, \ldots, w_{i-1})$ as to an optional number of words $w_1, w_2, \ldots, w_{i-1}, w_i$. In the embodiment of the present invention, this conditional probability $p(w_i|w_1, w_2, \ldots, w_{i-1})$ is used as a value that represents the naturalness of the sentence composed of the words $w_1, w_2, \ldots, w_{i-1}, w_i$ (i.e., a value representing the plausibility of the sentence). At this time, in a case where the conditional probability $p(w_i|w_1, w_2, \ldots, w_{i-1})$ is not less than a predetermined threshold value set in advance, the sentence composed of the words $w_1, w_2, \ldots, w_{i-1}, w_i$ satisfies the conditions relating to naturalness of the sentence, and otherwise, the sentence composed of the words $w_1, w_2, \ldots, w_{i-1}, w_i$ does not satisfy the conditions relating to naturalness of the sentence.

Note that the frequency probability $p(w_1, w_2, \ldots, w_{i-1}, w_i)$ of the sentence composed of the i number of words $w_1, w_2, \ldots, w_{i-1}, w_i$ may be used as a value representing the naturalness of this sentence. This frequency probability $p(w_1, w_2, \ldots, w_{i-1}, w_i)$ can be calculated by $p(w_1, w_2, \ldots, w_{i-1}, w_i) = p(w_1) \times p(w_2|w_1) \times \ldots \times p(w_i|w_1, w_2, \ldots, w_{i-1})$. In this case, in a case where the frequency probability $p(w_1, w_2, \ldots, w_{i-1}, w_i)$ is not less than a predetermined threshold value, the sentence composed of the words $w_1, w_2, \ldots, w_{i-1}, w_i$ satisfies the conditions relating to naturalness of the sentence, and otherwise, the sentence composed of the words $w_1, w_2, \ldots, w_{i-1}, w_i$ does not satisfy the conditions relating to naturalness of the sentence.

Note, however, that the embodiment of the present invention can use language models other Than the RNN language model. Any language model may be used as long as a language model that takes words, text strings, sentences, and so forth as input, and outputs values representing the naturalness (values representing the plausibility thereof) with regard to these sequences of words and text strings, sentences themselves, and so forth. Also, values representing naturalness of the sequence of words and text strings, and sentences, may be acquired or calculated by rule-based techniques or the like, besides language models.

The input unit 101 inputs text as input data (hereinafter also referred to as "input text"). As described above, the input unit 101 may take, as input data, words, phrases, clauses, sets of words, one or more letters and the number of these letters, or the like. Also, the input data may be data where speech is converted into text by speech recognition technology or the like. Accordingly, it is sufficient for the input data to be data relating to a plurality of letters included in a text string generated by the generating device 10 (e.g., an anagram).

Note that the input unit 101 may input input data from an optional input source. For example, the input unit 101 may input input data stored in an auxiliary storage device or the like, may receive and input input data transmitted from another device connected a a communication network, and may input input data input by a user using an input device such as a keyboard or the like.

The matrix creating unit 102 creates a number-of-occurrences vector F that represents the number of occurrences of each of the letters included in the input text. The matrix creating unit 102 also acquires words to serve as candidates to be included in anagrams from the vocabulary storage unit 106, and creates a matrix X in which the number of occurrences of each of the letters included in these acquired words are row vectors.

The search processing unit 103 uses the number-of-occurrences vector F, the matrix X, and the RNN language model stored in the language model storage unit 107, to search and generate a natural anagram (e.g., a text string obtained by rearranging a text string represented by the input data, and is also a text string satisfying conditions relating to naturalness of the sentence) by the depth-first search algorithm. Each time an anagram is searched and generated, processing for searching and generating anagrams (searching processing) by the depth-first search algorithm is temporarily stopped, and the output unit 104 outputs the searched and generated anagram.

The output unit 104 outputs the anagram generated by the search processing unit 103 as output data. At this time, each time an anagram is generated by the search processing unit 103, the output unit 104 outputs this anagram as output data. That is to say, the search processing unit 103 generally searches and generates one or more anagrams, and the output unit 104 sequentially outputs these searched and generated anagrams as output data. Note that depending on the input data, the words stored in the vocabulary storage unit 106, and so forth, there may be situations where the search processing unit 103 does not search and generate a single anagram.

The output data is not limited to be a sentence (anagram), as long as it is a text string where the text string that the input data represents has been rearranged, and is a text string that satisfies conditions relating to naturalness of the sentence. For example, the output data may be words, phrases, clauses, sets of words and the sequence of the words, one or more letters and the number and sequence of each of these letters, and so forth.

Note that the output unit 104 may output the output data to an optional output destination. For example, the output unit 104 may output the output data to an auxiliary storage device or the like, may output (transmit) the output data to another device connected via a communication network, or may output (display) the output data on a display device such as a display or the like.

In a case of the output data being output by the output unit 104, the ending condition determining unit 105 determines whether or not predetermined ending conditions are satisfied. In a case of the ending condition determining unit 105 determining that the predetermined ending conditions are not satisfied, searching processing by the search processing unit 103 is resumed. Conversely, in a case of determination that the predetermined ending conditions are satisfied, the searching processing ends. Examples of the predetermined ending conditions here include that the count of output data output by the output unit 104 has reached a predetermined count, all anagrams have been searched from the text string represented by the input data, and so forth.

<Hardware Configuration of Generating Device 10>

Figure 2:
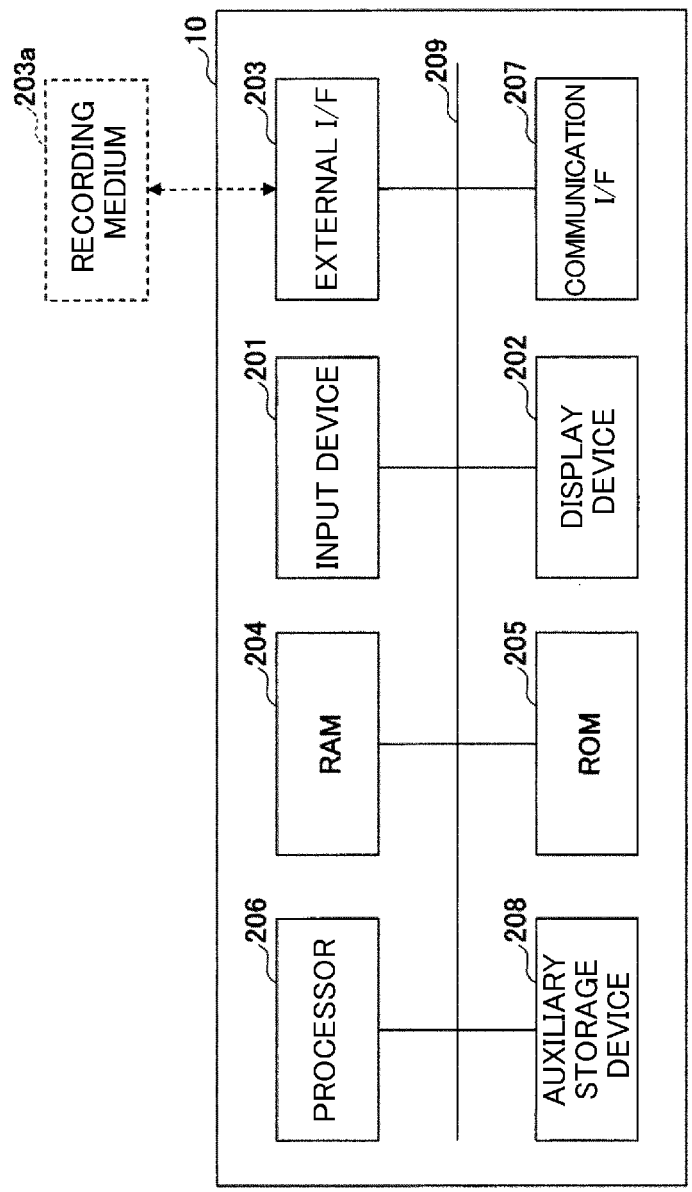
FIG. 2 is a diagram illustrating an example of a hardware configuration of the generating device according to the embodiment of the present invention.

Next, the hardware configuration of the generating device 10 according to the embodiment of the present invention will be described with reference to FIG. 2. FIG. 2 is a diagram illustrating an example of the hardware configuration of the generating device 10 according to the embodiment of the present invention.

The generating device 10 according to the embodiment of the present invention has, as hardware, an input device 201, a display device 202, an external I/F 203, RAM (Random Access Memory) 204, ROM (Read Only Memory) 205, a processor 206, a communication I/F 207, and an auxiliary storage device 208, as illustrated in FIG. 2. This hardware is each communicably connected via a bus 209.

The input device 201 is, for example, a keyboard, mouse, touch panel, etc., and is used for a user to input various types of operations. The display device 202 is, for example, a display or the like, and displays processing results of the generating device 10 (e.g., generated anagrams and so forth). Note that the generating device 10 may not have at least one of the input device 201 and the display device 202.

The external I/F 203 is an interface to an external recording medium, such as a recording medium 203a or the like. The generating device 10 can perform reading, writing, and so forth, regarding the recording medium 203a via the external I/F 203. One or more programs or the like that realize the functional units that the generating device 10 has (e.g., the input unit 101, the matrix creating unit 102, the search processing unit 103, the output unit 104, the ending condition determining unit 105, and so forth) may be recorded in the recording medium 203a.

Examples of the recording medium 203a include flexible disks, CDs (Compact Disc), DVDs (Digital Versatile Disk), SD memory cards (Secure Digital memory card), USB (Universal Serial Bus) memory cards, and so forth.

The RAN 204 is volatile semiconductor memory that temporarily holds programs and data. The ROM 205 is nonvolatile semiconductor memory that can hold programs and data even when electric power is cut off. Settings information relating to an OS (Operating System), settings information relating to a communication network, and so forth, for example, are stored in the ROM 205.

The processor 206 is a CPU (Central Processing Unit) a CPU (Graphics Processing Unit), or the like, for example, and is a computing device that reads programs and data from the ROM 205, the auxiliary storage device 208, and so forth, to the RAM 204, and executes processing. The functional units that the generating device 10 has are realized by one or more programs stored in the ROM 205, the auxiliary storage device 208, and so forth, being read to the RAM 204 and the processor 206 executing processing.

The communication I/F 207 is an interface for connecting the generating device 10 to a communication network. One or more programs that realize the functional units that the generating device 10 has may be acquired (downloaded) from a predetermined server or the like via the communication I/F 207.

The auxiliary storage device 208 is, for example, an HDD (Hard Disk Drive), an SSD (Solid State Drive), or the like, and is a nonvolatile storage device that stores programs and data. Examples of programs and data stored in the auxiliary storage device 208 include the OS, application programs that realize various types of functions on the OS, one or more programs that realize the functional units that the generating device 10 has, and so forth. Also, the storage units that the generating device 10 has (e.g., the vocabulary storage unit 106, the language model storage unit 107, etc.) can be realized using the auxiliary storage device 208, for example. Note however, that at least one storage unit of these storage units may be realized using a storage device or the like connected to the generating device 10 via a communication network.

The generating device 10 according to the embodiment of the present invention can realize later-described anagram generating and outputting processing with the hardware configuration illustrated in FIG. 2. Note that in the example illustrated in FIG. 2, a case where the generating device 10 according to the embodiment of the present invention is realized by one device (computer) is illustrated, but this is not limiting. The generating device 10 according to the embodiment of the present invention may be realized by a plurality of devices (computers). Also, a plurality of processors 206 and a plurality of memory (RAM 204, ROM 205, auxiliary storage device 208, etc.) may be included in one device (computer).

<Anagram Generating and Outputting Processing>

Figure 3:
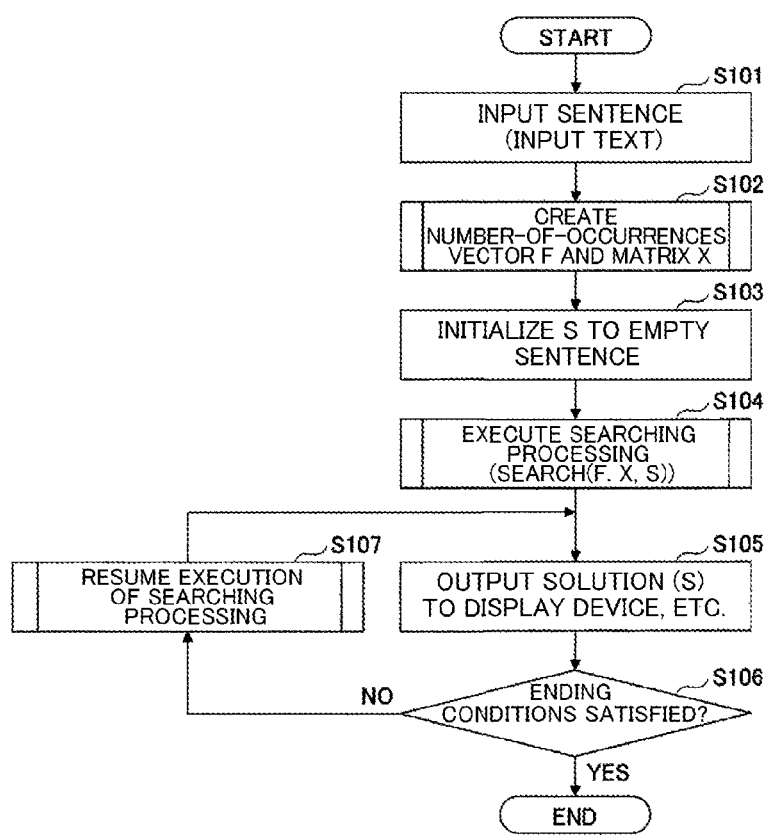
FIG. 3 is a flowchart illustrating an example of anagram generating and outputting processing according to the embodiment of the present invention.

Next, processing of the generating device 10 according to the embodiment of the present invention performing processing of generating and outputting anagrams will be described with reference to FIG. 3. FIG. 3 is a flowchart illustrating an example of processing of generating and outputting anagrams according to the embodiment of the present invention.

First, the input unit 101 inputs input text as input data (step S101).

Next, the matrix creating unit 102 creates the number-of-occurrences vector F and the matrix X (step S102). Note that details of the creating processing of the number-of-occurrences vector F and the matrix X will be described later.

Next, the search processing unit 103 initializes a sentence S to be output from the output unit 104 as output data to an empty sentence (e.g., S=" ") (step S103). Words are added to S in later-described search processing, thereby generating a sentence that is output as output: data (that is to say, an anagram for example).

Next, the search processing unit 103 uses the number-of-occurrences vector F, the matrix N, and the RNN language model stored in the language model storage unit 107 to search and generate an anagram that satisfies the constraint conditions, by the depth-first search algorithm (step S104). The searching processing here is executed by a function SEARCH (F, X, S) that takes the number-of-occurrences vector F, the matrix X, and the sentence S as parameters, being called up. Note that details of the searching processing will be described later.

In a case where an anagram that satisfies the constraint conditions is searched and generated in the searching processing, the searching processing is temporarily interrupted (later-described step S315). The output unit 104 then outputs the anagram generated by the search processing unit 103 (i.e., the sentence S) as output data, to the display device 202 such as a display or the like, for example (step S105). Accordingly, each time an anagram that satisfies the constraint conditions is searched and generated i n the searching processing, the anagram is sequentially displayed on the display device 202. Note that the anagram (S) satisfying the constraint conditions is obtained as a solution of the search processing.

Next, the ending condition determining unit 105 determines whether predetermined ending conditions are satisfied or not (step S106).

In a case where the determination is made in step S106 that predetermined ending conditions are satisfied, the generating device 10 ends anagram generating and outputting processing.

Conversely, in a case where determination is made in step S106 that predetermined ending conditions are not satisfied, the search processing unit 103 resumes execution of the searching processing (step S107). That is to say, the search processing unit 103 resumes execution of the searching processing that was interrupted by the anagram satisfying the constraint conditions being searched and generated. Note that when resuming execution of the searching processing, execution of the searching processing is resumed from the next processing from the position where the searching processing was interrupted (later-described step S315).

Thus, in the anagram generating and outputting processing illustrated in FIG. 3, each time an anagram satisfying the constraint conditions is searched and generated in the searching processing, the anagram is sequentially output as output data, and determination is made whether or not to continue (resume) the searching processing. However, there is no need to always sequentially output the output data. For example, after searching and generating all anagrams that satisfy the constraint conditions in the searching processing, these generated anagrams may be output as output data.

Figure 4:
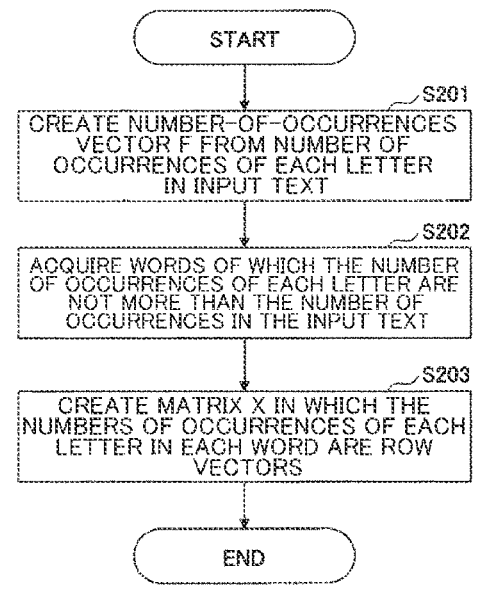
FIG. 4 is a flowchart illustrating an example of processing of creating a number-of-occurrences vector and a matrix according to the embodiment of the present invention.

<<Creating Processing of Number-of-Occurrences Vector F and Matrix F>>Next, the processing of creating the number-of-occurrences vector F and the matrix X in the above step 3102 will be described with reference to FIG. 4. FIG. 4 is a flowchart illustrating an example of creating processing of the number-of-occurrences vector and the matrix according to the embodiment of the present invention.

First, the matrix creating an it 102 creates the number-of-occurrences vector F that represents the number of occurrences of each letter included in the input text (step 3201). Note that the number of occurrences may be referred to as "occurrence frequency", or simply "frequency" or the like.

Now, FIG. 5 illustrates a number-of-occurrences vector F in a case where the input text is "Christmas", as an example. In a case where the input text is "Christmas", the number of occurrences of the letter "c" in the input text is one time, the number of occurrences of the letter "h" in the input text is one time, the number of occurrences of the letter "r" in the input text is one time, the number of occurrences of the letter "i" in the input text is one time, the number of occurrences of the letter "s" in the input text is two times, the number of occurrences of the letter "t" in the input text is one time, the number of occurrences of the letter "m" in the input text is one time, and the number of occurrences of the letter "a" in the input text is one time.

Accordingly, the number-of-occurrences vector F (1, 1, 1, 1, 1, 1, 2, 1) illustrated in FIG. 5 is obtained by arraying the number of occurrences of each letter in alphabetical order, for example. Note that in the number-of-occurrences vector F illustrated in FIG. 5, the first dimension corresponds to the letter "a", the second dimension to the letter "c", the third dimension to the letter "h", the fourth dimension to the letter "i", the fifth dimension to the letter "m", the sixth dimension to the letter "r", the seventh dimension to the letter "s", and the eighth dimension to the letter "t", respectively.

Thus, the number-of-occurrences vector F is expressed as a vector where the number of types of different letters in the input text is the number of dimensions, and the elements are the number of occurrences of the corresponding letters in the input text.

Next, the matrix creating unit 102 acquires words composed of letters included in the input text, of which the number of occurrences of each letter composing the words is no greater than the number of occurrences of that letter in the input text, from the vocabulary storage unit 106 (step S202). For example, in a case where the input text is "Christmas", words that are composed of at least one letter of the letters "c", "h", "r", "i", "s", "t", "m", and "a", and the number of occurrences of each letter composing the words is no greater than the number of occurrences of that letter in the input text, are acquired. Examples of such words include "trims", "a", "cash", "shirts", "has", and so forth. Description will continue below assuming that the words "trims", "a", "cash", "shirts", and "has" have been acquired, as one example.

Next, the matrix creating unit 102 creates the matrix X, in which the numbers of occurrences of each letter in each word acquired in step S202 above are row vectors (step S203). At this time, the number of dimensions of each row vector is the same as the number-of-occurrences vector F, and the correlative relation between the elements and the letters is also the same as the number-of-occurrences vector F. Note that the value of elements (number of occurrences) corresponding to letters not included in the words is set to "0".

For example, in a case of the word "trims", the row vector of this word is (0, 0, 0, 1, 1, 1, 1, 1). In the same way, for example, in a case of the word "a", the row vector of this word is (1, 0, 0, 0, 0, 0, 0, 0). In the same way thereafter, the row vector of the word "cash" is (1, 1, 1, 0, 0, 0, 1, 0), the row vector of the word "shirts" is (0, 0, 1, 1, 0, 1, 2, 1), and the row vector of the word "has" is (1, 0, 1, 0, 0, 0, 1, 0). Thus, the matrix X illustrated in FIG. 5 is created. Note that while the row vector of the word "trims", the row vector of the word "a", the row vector of the word "cash", the row vector of the word "shirts", and the row vector of the word "has" are each arrayed in that order from the top in the matrix X illustrated in FIG. 5, this order may be optional.

In this way, the matrix X has, as the rows thereof, candidates of words composing anagrams, and is configured of row vectors of which the number of occurrences of each letter included in these candidate words are the elements.

<<Searching Processing>>

Figure 6:
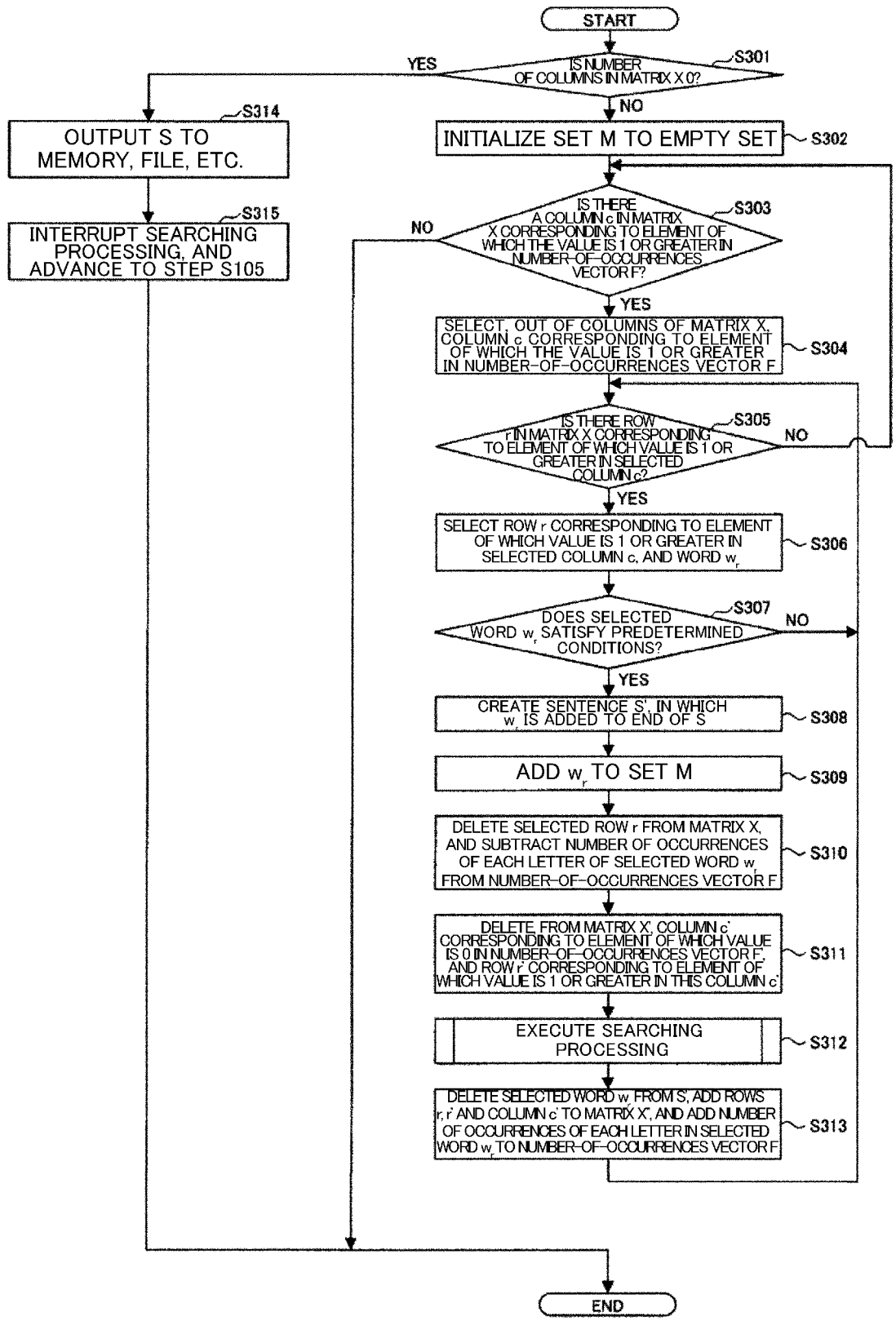
FIG. 6 is a flowchart illustrating an example of searching processing according to the embodiment of the present invention.

Next, the searching processing in the above step S104 and step S107 will be described with reference to FIG. 6, FIG. 6 is a flowchart illustrating an example of searching processing according to the embodiment of the present invention. Note that the searching processing is executed by calling Up the function SEARCH (F, X, S) in which the number-of-occurrences vector F, the matrix X, and the sentence S are parameters.

First, the search processing unit 103 determines whether the number of rows in the matrix X is 0 or not (step S301). Note that in the later-described step S311, rows corresponding to letters that cannot be used any more since they are already used in the sentence S are deleted from the matrix X.

In a case where determination is made in step S301 that the number of rows in the matrix X is not 0, the search processing unit 103 initializes a set M to an empty set (step S302). The set M is a cache for preventing SEARCH (F, X, S) with the same sentence S as a parameter from being called up a plurality of times.

Next, the search processing unit 103 determines whether or not there is a column c, which corresponds to elements with a value of 1 or greater in the number-of-occurrences vector F (i.e., an element where the number of occurrences of the letter is one or more), and which is not selected yet in a later-described step S304, in the matrix X (step S303).

In a case where determination is made in step S303 that the corresponding column c is not present in matrix X, the search processing unit 103 ends the searching processing. In this case, the generating device 10 executes the following processing at the position of the callup source of this searching processing (one of step S104, step S107, and a later-described step S312).

Conversely, in a case where determination is made instep 3303 that the corresponding column c is present, the search processing unit 103 selects from the matrix X the column c, which corresponds to elements with a value of 1 or greater in the number-of-occurrences vector F, and which is not selected yet (step S304). Hereinafter, a certain column c that is selected in this step will be referred to as "selected column c".

Next, the search processing unit 103 determines whether or not there is an element that has a value in the selected column c of 1 or greater and corresponds to a row r not yet selected in a later-described step S306, in the selected column c (step S305).

In a case where determination is made in step S305 that this element is not present in the selected column c, the search processing unit 103 returns to step S303. Accordingly, determination is made in the above step S303 regarding whether or not there is a column c corresponding to an element of which the value is 1 or Greater in the number-of-occurrences vector F, and that is not yet selected, in the matrix X.

Conversely, in a case where determination is made in step S305 that this element is present in the selected column c, the search processing unit 103 selects the row r which corresponds to the element of which the value in the selected column c is 1 or greater, and which is not selected yet, from the matrix X, and selects a word $w_r$ corresponding to this selected row r (step S306). Hereinafter, a certain row r which is selected in this step will be referred to as "selected row r", and the word $w_r$ corresponding to this selected row r will be referred to as "selected word $w_r$". Note that the vocabulary storage unit 106 may select this selected word $w_r$.

Next, the search processing unit 103 determines whether or not the selected word $w_r$ satisfies all of the following constraint condition 1 through constraint condition 3 (step S307). Note that the following constraint condition 1 corresponds to a condition relating to the naturalness of the text. Conversely, constraint condition 2 is a condition for searching and generating an anagram, and constraint condition 3 is a condition for effectively performing the searching.

Constraint condition 1: a conditional probability $p(w_r|S)$ is output using the RNN language model stored in the language model storage unit 107; whether or not this conditional probability $p(w_r|S)$ is not lower than a predetermined threshold value.

In a case where the conditional probability $p(w_r|S)$ is no lower than the predetermined threshold value, constraint condition 1 is satisfied, and otherwise, constraint condition 1 is not satisfied.

Constraint condition 2: whether or not the number of occurrences of each letter included in the selected word w is no greater than the values of the elements corresponding to these letters in the number-of-occurrences vector F.

In a case where the number of occurrences of all letters included in the selected word $w_r$ is no greater than the values of the elements each corresponding to all of these letters in the number-of-occurrences vector F, constraint condition 2 is satisfied, and otherwise, constraint condition 2 is not satisfied.

Constraint condition 3: whether or not the selected word $w_r$ is not included n the set M In a case where the selected word $w_r$ is not included in the set M, constraint condition 3 is satisfied, and otherwise, constraint condition 3 is not satisfied.

In a case where determination is made in step S307 that at least one of the constraint conditions of constraint condition 1 through constraint condition 3 is not satisfied, the search processing unit 103 returns co step S305. Accordingly, in the above step S305, determination is made regarding whether or not there is an element in the selected column c of which the value in the selected column c is 1 or greater, and which corresponds to a row r that is not selected yet. Thus, in a case where at least one of the constraint conditions of constraint condition 1 through constraint condition 3 is not satisfied, pruning is performed in the depth-first search algorithm, and searching and generating of anagrams can be performed efficiently.

Conversely, in a case where determination is made in step S307 that all of constraint condition 1 through constraint condition 3 are satisfied, the search processing unit 103 creates a sentence S' in which the selected word $w_r$ is added to the end of the sentence S (S308).

Next, the search processing unit 103 adds the selected word $w_r$ to the set M (step S309).

Next, the search processing unit 103 deletes the selected row r from the matrix X, and subtracts the number of occurrences of each letter included in the selected word $w_r$ from the elements of these letters in the number-of-occurrences vector F (step S310). For example, in a case where the selected word $w_r$ is "shirts", the search processing unit 103 subtracts 1 from each of the element of the third dimension, the element of the fourth dimension, the element of the sixth dimension, and the element of the eighth dimension, and subtracts 2 from the element of the seventh dimension out of the elements of the number-of-occurrences vector F shown in FIG. 5. Hereinafter the matrix X after which the selected row r is deleted in this step will be referred to as "matrix X'", and the number-of-occurrences vector F following subtraction will be referred to as "number-of-occurrences vector F'".

Next, the search processing unit 103 deletes a column c' corresponding to an element of which the value in the number-of-occurrences vector F' is 0, and a row r' corresponding to an element of which the value in this column c' is 1 or greater, from the matrix X' (step S311). Accordingly, as a result of the selected word $w_r$ being added to the sentence S, the column c' corresponding to the letters no longer usable, and the row r corresponding to the word containing these letters, are deleted from the matrix X'. Hereinafter, this matrix X' following deletion will be referred to as "matrix X''".

Next, the search processing unit 103 calls up the function SEARCH (F, X, S) with F=F', X=X'', and S=S', and executes searching processing (step S312). That is to say, the search processing unit 103 recursively executes searching processing.

Next, following the searching processing executed in the above step S312 ending, the search processing unit 103 executes the following (1) through (3) as backtrack processing (step S313).

(1) Deleting the selected word $w_r$ added to S in step S308 above, and returning S' to S.

(2) Adding the selected row r deleted in the above step S310 and the column c' and the row r' deleted in the above step S311 to the matrix X", and returning the matrix X" to the matrix X.

(3) Adding the values subtracted in the above step S310 to the number-of-occurrences vector F', and returning the number-of-occurrences vector F' to the number-of-occurrences vector F.

Accordingly, backtrack (or backtracking) in the depth-first search algorithm is performed.

Conversely, in a case where the number of columns of the matrix X is determined to be 0 in the above step S301, the search processing unit 103 outputs S to memory, a file, or the like (step S314). That is to say, the search processing unit 103 outputs S as the return value of the function SEARCH (F, X, S). The S output here is the solution of the searching processing (or more accurately, one of the solutions), and is output by the output unit 104 in the above step S105.

Next, the search processing unit 103 interrupts execution of the searching processing (step S315). The generating device 10 then advances to the processing of the above step S105. Note that in order to enable resuming execution of the searching processing in the above step S107, the search processing unit 103 stores information necessary for resuming (e.g., the number-of-occurrences vector F, matrix X, sentence S, position for resuming searching processing, and so forth, at the current point in time) in memory or the like, and thereafter interrupts execution of searching processing.

<Summarization>

Thus, the generating device 10 according to the embodiment of the present invention can use a given text string and generate another text string satisfying constraint conditions (e.g., an anagram that is a natural sentence, etc.) by a depth-first search algorithm. Also, at this time, in a case in which a word composing another text string goes not satisfy the constraint conditions, the generating device 10 according to the embodiment of the present invention performs pruning of the depth-first search algorithm, and thereby can efficiently generate another text string that satisfies the constraint conditions.

Although a case of searching and generating all anagrams satisfying the constraint conditions as solutions by a depth-first search algorithm has been described as an example in the embodiment of the present invention, searching and generating may be performed with an optional number of anagrams that satisfy the constraint conditions (in particular, including one anagram that satisfies the constraint conditions) as the solutions, for example. In this case, the generating device 10 may cancel searching processing in a case where searching and generating of anagrams of the number set in advance as solutions is done.

The present invention is not limited to the specifically disclosed above embodiments, and various modifications and alterations may be made without departing from the scope of the Claims.

REFERENCE SIGNS LIST

10 Generating device
101 Input unit
102 Matrix creating unit
103 Search processing unit
104 Output unit
105 Ending condition determining unit
106 Vocabulary storage unit
107 Language model storage unit

The invention claimed is:

1. A generating device, comprising a processor configured to execute operations comprising:
    receiving first data, wherein the first data comprises a plurality of letters included in a text string as a generation target; and
    generating, based at least on operations performed by a recurrent neural network, second data,
        wherein the second data comprises the plurality of letters of the text string,
        the second data satisfies a plurality of predetermined constraints,
        the plurality of predetermined constraints comprises:
            a first predetermined constraint indicating plausibility of the sequence of words as a phrase in the second data based on the plurality of letters of the text string of the first data according to a prediction value,
            the recurrent neural network predicts the prediction value, the prediction value represents plausibility of the sequence of words, the plausibility of the sequence of words indicates semantic naturalness of the sequence of words,
            the prediction value indicates a conditional probability of the last word in the sequence of words of the phrase in the second data in the sequence of words from a forefront word of the second data to an immediately-prior-to the-last word in the sequence of words of the phrase in the second data,
            a second predetermined constraint indicates a number of occurrences of respective letters of the last word of the sequence of words being no greater than a number of occurrences of the respective words of the last word in the text string of the first data,
            a third predetermined constraint indicates the last word being distinct from other words in the sequence of words, and
        the generating further comprises terminating the depth-first search of the sequence of words based on the plausibility of the sequence of words; and
    transmitting at least a part of the second data to an application, wherein the application sequentially outputs the second data as one or more anagrams of the first data, wherein the at least a part of the second data excludes a set of letters of the plurality of letters as an anagram of the first data based on the prediction value.

2. The generating device according to claim 1, wherein the generating second data further comprises searching for a text string that satisfies the constraint by a depth-first search, and wherein, in the depth-first search, in a case where a letter or a word that does not satisfy the constraints is searched as a letter or word composing the text string, subsequent searching for a letter or a word is not performed after the letter or the word.

3. The generating device according to claim 2, wherein, on the basis of a number of occurrences of each letter included in a plurality of letters represented by the first data, data relating to the number of occurrences of each letter included in the plurality of letters is taken as first number-of-occurrences data, the generating device further comprising:
    referring a vocabulary store in which a plurality of pieces of word data is stored,
    acquiring word data of a word regarding which the number of occurrences of each letter included in the word is not more than the number of occurrences of each of the letters represented by the first number-of-occurrences data from the vocabulary store, and generating data, wherein the data is based on the number of occurrences of each letter included in a word represented by each of word data that is acquired, and the generating the second number-of-occurrences data further comprises searching for a text string satisfying the constraints by the depth-first search, using the first number-of-occurrences data and the second number-of-occurrences data.

4. The generating device according to claim 1, wherein the constraints indicating plausibility represent constraints based on a value representing plausibility of the sequence of letters, calculated by a predetermined language model or a rule-based technique.

5. The generating device according to claim 1, wherein the constraints include:
    a first constraint for converting a text string represented by the second data into a text string in which a plurality of letters represented by the first data are rearranged, and
    a second constraint is based on a number of occurrences of a letter in the first letter.

6. The generating device according to claim 1, wherein the plurality of letters represented by the first data are at least one of a sentence, word, phrase, clause, set of words, and set of letters and the number of the letters.

7. A computer implemented method for generating text data, comprising:
    receiving first data, wherein the first data comprises a plurality of letters included in a text string as a generation target; and
    generating, based at least on operations performed by a recurrent neural network second data,
        wherein the second data comprises the plurality of letters of the text string,
        the second data satisfies constraints comprises:
            a first constraint indicating plausibility of the sequence of words as a phrase in the second data based on the plurality of letters of the text string of the first data according to a prediction value,
            the recurrent neural network predicts the prediction value, the prediction value represents plausibility of the sequence of words, and the plausibility of the sequence of words indicates the plausibility of the sequence of words indicates semantic naturalness of the sequence of letters,
            the prediction value indicates a conditional probability of the last word in the sequence of words of the phrase in the second data in the sequence of words from a forefront word of the second data to an immediately-prior-to the-last word in the sequence of words of the phrase in the second data,
            a second constraint indicates a number of occurrences of respective letters of the last word of the sequence of words being no greater than a number of occurrences of the respective words of the last word in the text string of the first data,
            a third constraint indicates the last word being distinct from other words in the sequence of words, and
            the generating further comprises terminating the depth-first search of the sequence of words based on the plausibility of the sequence of words; and transmitting at least a part of the second data to an application, wherein the application sequentially outputs the second data as one or more anagrams of the first data, wherein the at least a part of the second data excludes a set of letters of the plurality of letters as an anagram of the first data based on the prediction value.

8. A computer-readable non-transitory recording medium storing computer-executable program instructions that when executed by a processor cause a computer system to:
    receiving first data, wherein the first data comprises a plurality of letters included in a text string as a generation target; and
    generating, based at least on operations performed by a recurrent neural network, second data,
        wherein the second data comprises the plurality of letters of the text string,
        the second data satisfies a plurality of predetermined constraints,
        the plurality of predetermined constraints comprises:
            a first predetermined constraint indicating plausibility of a sequence of words as a phrase in the second data based on the plurality of letters of the text string of the first data according to a prediction value,
            the recurrent neural network predicts the prediction value, the prediction value represents plausibility of the sequence of words, and the plausibility of the sequence of words indicates semantic naturalness of the sequence of words, and
            the prediction value indicates a conditional probability of the last word in the sequence of words of the phrase in the second data in the sequence of words from a forefront word of the second data to an immediately-prior-to the-last word in the sequence of words of the phrase in the second data,
            a second predetermined constraint indicates a number of occurrences of respective letters of the last word of the sequence of words being no greater than a number of occurrences of the respective words of the last word in the text string of the first data,
            a third predetermined constraint indicates the last word being distinct from other words in the sequence of words, and
            the generating further comprises terminating the depth-first search of the sequence of words, based on the plausibility of the sequence of words; and
    transmitting at least a part of the second data to an application, wherein the application sequentially outputs the second data as one or more anagrams of the first data, wherein the at least a part of the second data excludes a set of letters of the plurality of letters as an anagram of the first data based on the prediction value.

9. The generating device according to claim 2, wherein the constraints indicating plausibility are constraints relating to a value representing plausibility of the sequence of letters, calculated by a predetermined language model or a rule-based technique.

10. The generating device according to claim 2, wherein the constraints include:
    a first constraint for converting a text string represented by the second data into a text string in which a plurality of letters represented by the first data are rearranged, and
    a second constraint is based on a number of occurrences of a letter in the first letter.

11. The generating device according to claim 2, wherein the plurality of letters represented by the first data are at least one of a sentence, word, phrase, clause, set of words, and set of letters and the number of the letters.

12. The generating device according to claim 3, wherein the constraints indicating are constraints relating to a value representing plausibility of the sequence of letters, calculated by a predetermined language model or a rule-based technique.

13. The generating device according to claim 3, wherein the constraints include:
- a first constraint for converting a text string represented by the second data into a text string in which a plurality of letters represented by the first data are rearranged, and
- a second constraint is based on a number of occurrences of a letter in the first letter.

14. The generating device according to claim 3, wherein the plurality of letters represented by the first data are at least one of a sentence, word, phrase, clause, set of words, and set of letters and the number of the letters.

15. The generating method according to claim 7, wherein the generating further comprises searching for a text string that satisfies constraints by the depth-first search, and wherein, in the depth-first search, in a case where a letter or a word that does not satisfy the constraints is searched as a letter or word composing the text string, subsequent searching for a letter or a word is not performed after the letter or the word.

16. The generating method according to claim 7, wherein the constraints indicating plausibility are constraints relating to a value representing plausibility of the sequence of letters, calculated by a predetermined language model or a rule-based technique.

17. The generating method according to claim 7, wherein the constraints include a constraint for converting a text string represented by the second data into a text string in which a plurality of letters represented by the first data are rearranged.

18. The generating method according to claim 7, wherein the plurality of letters represented by the first data are at least one of a sentence, word, phrase, clause, set of words, and set of letters and the number of the letters.

19. The generating method according to claim 15, wherein, on the basis of a number of occurrences of each letter included in a plurality of letters represented by the first data, data relating to the number of occurrences of each letter included in the plurality of letters is taken as first number-of-occurrences data, the processor further configured to execute operations comprising:
- referring a vocabulary store in which a plurality of pieces of word data is stored,
- acquiring word data of a word regarding which the number of occurrences of each letter included in the word is not more than the number of occurrences of each of the letters represented by the first number-of-occurrences data from the vocabulary store, and
- generating second number-of-occurrences data, wherein the second number-of-occurrences data indicates the number of occurrences of each letter included in a word represented by each of word data that is acquired, and the generating the second number-of-occurrences data further comprises searching for a text string satisfying the constraints by the depth-first search, using the first number-of-occurrences data and the second number-of-occurrences data.

20. The computer-readable non-transitory recording medium of claim 8, wherein the generating further comprises searching for a text string that satisfies constraints by a depth-first search, and
wherein, in the depth-first search, in a case where a letter or a word that does not satisfy the constraints is searched as a letter or word composing the text string, subsequent searching for a letter or a word is not performed after the letter or the word.

* * * * *